US010284340B2

United States Patent
Zhu et al.

(10) Patent No.: US 10,284,340 B2
(45) Date of Patent: May 7, 2019

(54) MULTICAST SENDING APPARATUS, MULTICAST RECEIVING APPARATUS, AND MULTICAST TRANSMISSION DETERMINING METHOD

(71) Applicant: Huawei Technologies Co., Ltd., Shenzhen (CN)

(72) Inventors: Jun Zhu, Shanghai (CN); Jun Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 15/244,932

(22) Filed: Aug. 23, 2016

(65) Prior Publication Data

US 2017/0012742 A1 Jan. 12, 2017

Related U.S. Application Data

(63) Continuation of application No. PCT/CN2014/072562, filed on Feb. 26, 2014.

(51) Int. Cl.
*H04L 1/08* (2006.01)
*H04L 12/18* (2006.01)
(Continued)

(52) U.S. Cl.
CPC .............. *H04L 1/08* (2013.01); *H04L 1/1614* (2013.01); *H04L 12/1872* (2013.01); *H04W 72/005* (2013.01); *H04W 74/08* (2013.01)

(58) Field of Classification Search
CPC ..... H04L 1/08; H04L 1/1614; H04L 12/1872; H04W 72/005; H04W 74/08
See application file for complete search history.

(56) References Cited

U.S. PATENT DOCUMENTS 5,265,239 A * 11/1993 Ardolino ................. G06F 13/10
709/203
2007/0286121 A1* 12/2007 Kolakowski ...... H04L 29/06027
370/329
(Continued)

FOREIGN PATENT DOCUMENTS

CN 101931874 A 12/2010
CN 102057608 A 5/2011
(Continued)

*Primary Examiner* — April Y Blair
*Assistant Examiner* — Dipakkumar B Gandhi
(74) *Attorney, Agent, or Firm* — Leydig, Voit & Mayer, Ltd.

(57) ABSTRACT

Embodiments of the present invention relate to the communications field, and provide a multicast sending apparatus, a multicast receiving apparatus, and a multicast transmission determining method. The method includes: sending at least one multicast frame to multiple stations in a multicast manner; generating a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame; and sending the multicast indication request frame to the multiple stations in a multicast manner.

18 Claims, 7 Drawing Sheets

(51) Int. Cl.
*H04L 1/16* (2006.01)
*H04W 72/00* (2009.01)
*H04W 74/08* (2009.01)

(56) References Cited

U.S. PATENT DOCUMENTS

| | | |
|---|---|---|
| 2010/0054175 A1 | 3/2010 | Maltsev et al. |
| 2011/0096710 A1 | 4/2011 | Liu et al. |
| 2012/0185846 A1* | 7/2012 | Recio .................... G06F 9/5077 |
| | | 718/1 |
| 2012/0201177 A1* | 8/2012 | Adachi ................ H04L 1/0083 |
| | | 370/310 |
| 2012/0239772 A1* | 9/2012 | Kubota .................. H04L 12/18 |
| | | 709/206 |
| 2013/0041934 A1* | 2/2013 | Annamalaisami .... H04L 43/026 |
| | | 709/203 |
| 2013/0163444 A1 | 6/2013 | Tee et al. |
| 2013/0250836 A1* | 9/2013 | Shiotani ................. H04W 4/06 |
| | | 370/312 |

FOREIGN PATENT DOCUMENTS

| | | |
|---|---|---|
| CN | 102144414 A | 8/2011 |
| GB | 2502619 A | 12/2013 |
| WO | 2013095355 A1 | 6/2013 |

\* cited by examiner

| Frame control | Duration | Receiver address | Transmitter address | Multicast indication request frame control | Multicast indication request frame information | Frame check |
|---|---|---|---|---|---|---|

FIG. 4

| Frame type | Frame subtype | Identifier |
|---|---|---|

FIG. 5

| Frame control | Duration | Receiver address | Transmitter address | Indication frame control | Indication frame information | Frame check |
|---|---|---|---|---|---|---|

FIG. 6

| Start frame sequence number | To-be-retransmitted multicast frame bitmap | Reserved bit |
|---|---|---|

FIG. 7

| Frame control | Duration | Receiver address | Multicast acknowledgment frame control | Multicast acknowledgment frame information | Frame check |
|---|---|---|---|---|---|

FIG. 8

| Start frame sequence number | To-be-retransmitted multicast frame bitmap | Reserved bit |
|---|---|---|

FIG. 9

MULTICAST SENDING APPARATUS, MULTICAST RECEIVING APPARATUS, AND MULTICAST TRANSMISSION DETERMINING METHOD

CROSS REFERENCE TO RELATED APPLICATIONS

This application is a continuation of International Patent Application No. PCT/CN2014/072562, filed on Feb. 26, 2014, which is hereby incorporated by reference in its entirety.

TECHNICAL FIELD

Embodiments of the present invention relate to the communications field, and in particular, to a multicast sending apparatus, a multicast receiving apparatus, and a multicast transmission determining method.

BACKGROUND

A multicast (also referred to as multi-address broadcast or multicast) technology is a Transmission Control Protocol/Internet Protocol (Transmission Control Protocol/Internet Protocol, "TCP/IP" for short) network technology that allows an access point to simultaneously send a single data packet to multiple stations at a time. As one-to-many communication, multicast enables data to be simultaneously transmitted to multiple stations, and is one of effective methods that improve a throughput rate of an area and save a network bandwidth.

However, it is difficult to ensure reliability of data received by multiple stations in multicast. Because a radio channel is unreliable, a multicast frame may be lost for various reasons. For example, an access point 1 and an access point 2 run on a same channel, and two basic service sets thereof overlap. When the access point 1 sends a multicast frame to several associated stations, the access point 2 cannot detect transmission performed by the access point 1 and therefore considers that the channel is idle. Therefore, the access point 2 may transmit a multicast frame to stations associated with the access point 2. In this case, a multicast frame transmitted by the access point 1 and a multicast frame transmitted by the access point 2 are lost because of a conflict in an overlapped area of the two basic service sets. As a result, a station in the overlapped area cannot correctly receive a multicast frame. Therefore, it is extremely important to provide a multicast transmission acknowledgment mechanism.

In an existing multicast transmission acknowledgment mechanism, an access point sends several multicast frames to multiple stations in a multicast manner, and subsequently sends a multicast block acknowledgment request frame to the stations in a multicast manner; and the stations sequentially reply with multicast block acknowledgment frames according to sequence information in the multicast block acknowledgment request frame.

In a process of implementing the present invention, the inventor finds that the prior art has at least the following problem:

In an intensive scenario, when there are many multicast receiving stations, there are many multicast block acknowledgment frames, which increases a network latency and reduces a system throughput rate.

SUMMARY

To resolve the problem in the prior art that when there are many multicast receiving stations, there are many multicast block acknowledgment frames, which increases a network latency and reduces a system throughput rate, embodiments of the present invention provide a multicast sending apparatus, a multicast receiving apparatus, and a multicast transmission determining method. The technical solutions are as follows:

According to one aspect, an embodiment of the present invention provides a multicast sending apparatus, where the apparatus includes:

a sending module, configured to send at least one multicast frame to multiple stations in a multicast manner; and a processing module, configured to generate a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame, where the sending module is further configured to send the multicast indication request frame to the multiple stations in a multicast manner.

In an implementation manner of this embodiment of the present invention, the apparatus further includes:

a receiving module, configured to receive the indication frame; and the processing module is configured to reply with a multicast acknowledgment frame after an indication frame is received each time, where the multicast acknowledgment frame is used to indicate an identifier of an acknowledged to-be-retransmitted multicast frame, and the indication frame is generated by the stations according to the multicast indication request frame or a last received multicast acknowledgment frame.

In another implementation manner of this embodiment of the present invention, the multicast indication request frame includes a multicast indication request frame control field and a multicast indication request frame information field, the multicast indication request frame control field includes a multicast session transaction identifier and contention window information, and the multicast indication request frame information field includes a start frame sequence number.

In another implementation manner of this embodiment of the present invention, the indication frame includes an indication frame control field and an indication frame information field, the indication frame control field includes a receiving station identifier, and the indication frame information field includes a start frame sequence number and a to-be-retransmitted multicast frame bitmap.

In another implementation manner of this embodiment of the present invention, the multicast acknowledgment frame includes a multicast acknowledgment frame information field, and the multicast acknowledgment frame information field includes a start frame sequence number and a to-be-retransmitted multicast frame bitmap.

In another implementation manner of this embodiment of the present invention, the processing module is configured to:

after the indication frame is received, check the indication frame; and when the check succeeds, acknowledge the to-be-retransmitted multicast frame and generate the multicast acknowledgment frame according to information of the indication frame.

In another implementation manner of this embodiment of the present invention, the processing module is further configured to:

after generating the multicast acknowledgment frame according to the information of the indication frame, determine whether all the at least one multicast frame needs to be retransmitted; and when all the at least one multicast frame needs to be retransmitted, send the multicast acknowledgment frame, and after sending the multicast acknowledgment frame, retransmit the to-be-retransmitted multicast frame; or when not all the at least one multicast frame needs to be retransmitted, send the multicast acknowledgment frame.

In another implementation manner of this embodiment of the present invention, the processing module is further configured to determine whether a first timer times out, where the first timer is used to indicate a contention window remaining time; and when the first timer times out, retransmit the to-be-retransmitted multicast frame; or when the first timer has not timed out, continue to receive the indication frame.

In another implementation manner of this embodiment of the present invention, the processing module is further configured to:

when a multicast indication request frame is sent to the multiple stations in a multicast manner, set a second timer, where the second timer is used to indicate a channel idle time; and when the second timer times out, retransmit the to-be-retransmitted multicast frame.

According to another aspect, an embodiment of the present invention further provides a multicast receiving apparatus, where the apparatus includes:

a receiving module, configured to receive a multicast indication request frame sent by an access point, where the multicast request indication frame includes an identifier of at least one multicast frame, and the multicast indication request frame is used to instruct multiple stations to send an indication frame within a specified timeslot in a unicast and contention-based manner;

a processing module, configured to determine an identifier of a to-be-retransmitted multicast frame according to the multicast indication request frame; and a sending module, configured to send the indication frame within the specified timeslot in a contention-based manner, where the indication frame includes the identifier of the to-be-retransmitted multicast frame.

In an implementation manner of this embodiment of the present invention, the receiving module is further configured to receive a multicast acknowledgment frame, where the multicast acknowledgment frame is sent by the access point after the access point receives the indication frame, and the multicast acknowledgment frame is used to indicate an identifier of an acknowledged to-be-retransmitted multicast frame; and when the identifier of the acknowledged to-be-retransmitted multicast frame in the multicast acknowledgment frame includes the identifier of the to-be-retransmitted multicast frame, stop sending the indication frame in a contention-based manner.

In another implementation manner of this embodiment of the present invention, the processing module is further configured to: when the indication frame is sent in a contention-based manner, determine whether a first timer times out, where the first timer is used to indicate a contention window remaining time; and when the first timer times out, stop sending the indication frame in a contention-based manner.

In another implementation manner of this embodiment of the present invention, the processing module is further configured to: when the indication frame is sent successfully in a contention-based manner, if a third timer times out and the multicast acknowledgment frame is not received, resend the indication frame in a contention-based manner, where the third timer is used to indicate a time that has elapsed after the indication frame is sent.

In another implementation manner of this embodiment of the present invention, the processing module is further configured to: when the indication frame is sent unsuccessfully in a contention-based manner, if the multicast acknowledgment frame is received, generate the indication frame according to the multicast acknowledgment frame, and resend the indication frame in a contention-based manner.

According to another aspect, an embodiment of the present invention further provides a multicast transmission acknowledgment method, where the method includes:

sending at least one multicast frame to multiple stations in a multicast manner;

generating a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame; and sending the multicast indication request frame to the multiple stations in a multicast manner.

In an implementation manner of this embodiment of the present invention, the method further includes:

receiving the indication frame; and replying with a multicast acknowledgment frame after receiving an indication frame each time, where the multicast acknowledgment frame is used to indicate an identifier of an acknowledged to-be-retransmitted multicast frame, and the indication frame is generated by the stations according to the multicast indication request frame or a last received multicast acknowledgment frame.

In another implementation manner of this embodiment of the present invention, the multicast indication request frame includes a multicast indication request frame control field and a multicast indication request frame information field, the multicast indication request frame control field includes a multicast session transaction identifier and contention window information that is used to indicate maximum duration within which the multiple stations send the indication frame in a contention-based manner, and the multicast indication request frame information field includes a start frame sequence number and an end frame sequence number.

In another implementation manner of this embodiment of the present invention, the indication frame includes an indication frame control field and an indication frame information field, the indication frame control field includes a receiving station identifier, and the indication frame information field includes a start frame sequence number and a to-be-retransmitted multicast frame bitmap.

In another implementation manner of this embodiment of the present invention, the multicast acknowledgment frame includes a multicast acknowledgment frame information field, and the multicast acknowledgment frame information field includes a start frame sequence number and a to-be-retransmitted multicast frame bitmap.

In another implementation manner of this embodiment of the present invention, the replying with a multicast acknowledgment frame after receiving an indication frame each time includes:

after receiving the indication frame, checking the indication frame; and when the check succeeds, acknowledging the to-be-retransmitted multicast frame and generating the multicast acknowledgment frame according to information of the indication frame.

In another implementation manner of this embodiment of the present invention, after the generating the multicast acknowledgment frame according to information of the indication frame, the method further includes:

determining whether all the at least one multicast frame needs to be retransmitted; and when all the at least one multicast frame needs to be retransmitted, sending the multicast acknowledgment frame, and after sending the multicast acknowledgment frame, retransmitting the to-be-retransmitted multicast frame; or when not all the at least one multicast frame needs to be retransmitted, sending the multicast acknowledgment frame.

In another implementation manner of this embodiment of the present invention, the method further includes:

determining whether a first timer times out, where the first timer is used to indicate a contention window remaining time; and when the first timer times out, retransmitting the to-be-retransmitted multicast frame; or when the first timer has not timed out, continuing to receive the indication frame.

In another implementation manner of this embodiment of the present invention, the method further includes:

when a multicast indication request frame is sent to the multiple stations in a multicast manner, setting a second timer, where the second timer is used to indicate a channel idle time; and when the second timer times out, retransmitting the to-be-retransmitted multicast frame.

According to another aspect, an embodiment of the present invention further provides a multicast transmission acknowledgment method, where the method includes:

receiving a multicast indication request frame sent by an access point, where the multicast request indication frame includes an identifier of at least one multicast frame, and the multicast indication request frame is used to instruct multiple stations to send an indication frame within a specified timeslot in a unicast and contention-based manner;

determining an identifier of a to-be-retransmitted multicast frame according to the multicast indication request frame; and sending the indication frame within the specified timeslot in a contention-based manner, where the indication frame includes the identifier of the to-be-retransmitted multicast frame.

In an implementation manner of this embodiment of the present invention, the method further includes:

receiving a multi cast acknowledgment frame, where the multicast acknowledgment frame is sent by the access point after the access point receives the indication frame, and the multicast acknowledgment frame is used to indicate an identifier of an acknowledged to-be-retransmitted multicast frame; and when the identifier of the acknowledged to-be-retransmitted multicast frame in the multicast acknowledgment frame includes the identifier of the to-be-retransmitted multicast frame, stopping sending the indication frame in a contention-based manner.

In another implementation manner of this embodiment of the present invention, when the indication frame is sent in a contention-based manner, the method further includes:

determining whether a first timer times out, where the first timer is used to indicate a contention window remaining time; and when the first timer times out, stopping sending the indication frame in a contention-based manner.

In another implementation manner of this embodiment of the present invention, when the indication frame is sent successfully in a contention-based manner, the method further includes:

when a third timer times out and the multicast acknowledgment frame is not received, resending the indication frame in a contention-based manner, where the third timer is used to indicate a time that has elapsed after the indication frame is sent.

In another implementation manner of this embodiment of the present invention, when the indication frame is sent unsuccessfully in a contention-based manner, the method further includes:

when the multicast acknowledgment frame is received, generating the indication frame according to the multicast acknowledgment frame, and resending the indication frame in a contention-based manner.

The technical solutions provided in the embodiments of the present invention have the following beneficial effects:

A multicast indication request frame is sent to multiple stations in a multicast manner to instruct the multiple stations to send an indication frame within a specified timeslot in a unicast and contention-based manner, the indication frame sent by the multiple stations in a contention-based manner is received, and a multicast acknowledgment frame is replied with after an indication frame is received each time, where the indication frame is generated by the stations according to the multicast indication request frame or a last received multicast acknowledgment frame, the indication frame includes an identifier of a to-be-retransmitted multicast frame, and identifiers of to-be-retransmitted multicast frames included in indication frames are different. Therefore, when the stations receive the multicast acknowledgment frame, if acknowledging that the multicast acknowledgment frame includes a multicast frame that needs to be retransmitted for the stations, the stations no longer need to send the indication frame, thereby saving a channel resource, and avoiding an increase in a network latency and a decrease in a system throughput rate.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 4 is a schematic structural diagram of a multicast indication request frame according to Embodiment 2 of the present invention;

FIG. 5 is a schematic structural diagram of a multicast indication request frame control field according to Embodiment 2 of the present invention;

FIG. 6 is a schematic structural diagram of an indication frame according to Embodiment 2 of the present invention;

FIG. 7 is a schematic structural diagram of an indication frame information field according to Embodiment 2 of the present invention;

FIG. 8 is a schematic structural diagram of a multicast acknowledgment frame according to Embodiment 2 of the present invention;

FIG. 9 is a schematic structural diagram of a multicast acknowledgment frame information field according to Embodiment 2 of the present invention;

DESCRIPTION OF EMBODIMENTS

To make the objectives, technical solutions, and advantages of the present invention clearer, the following further describes the embodiments of the present invention in detail with reference to the accompanying drawings.

Figure 1:
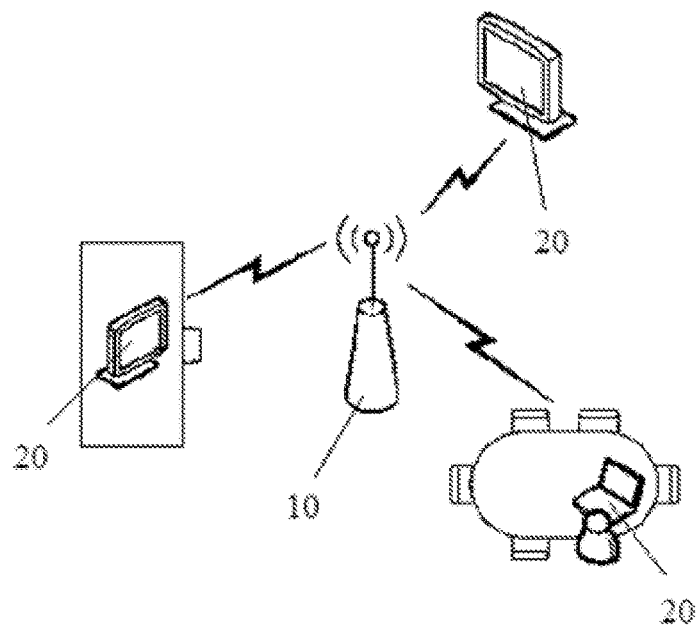
FIG. 1 is a diagram of an application scenario according to an embodiment of the present invention.

The following first simply describes an application scenario of the embodiments of the present invention. Referring to FIG. 1, an access point (a multicast sending apparatus) 10 and multiple stations (multicast receiving apparatuses) 20 are connected wirelessly, for example, are connected by using a WiFi technology. The stations 20 may be common mobile devices such as a notebook computer and a mobile phone. The access point 10 and the multiple stations 20 are in a basic service set. The access point 10 simultaneously sends a multicast frame to the multiple stations 20 in the basic service set.

It should be noted that the device type, the connection relationship, and the connection manner described above are merely exemplary, and the present invention sets no limitation thereto.

Embodiment 1

Figure 2:
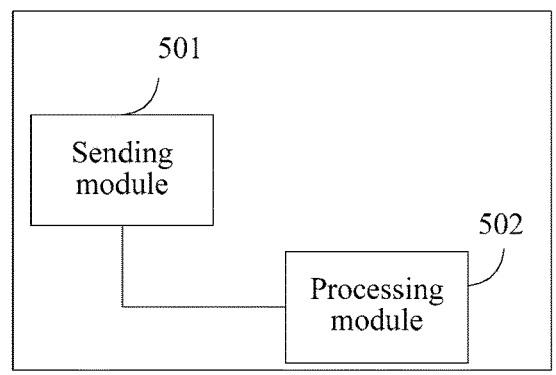
FIG. 2 is a schematic structural diagram of a multicast sending apparatus according to Embodiment 1 of the present invention.

This embodiment of the present invention provides a multicast sending apparatus. Referring to FIG. 2, the apparatus includes:

a sending module 501, configured to send at least one multicast frame to multiple stations in a multicast manner; and a processing module 502, configured to generate a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame, where the sending module 501 is further configured to send the multicast indication request frame to the multiple stations in a multicast manner.

The multicast indication request frame may include a multicast indication request frame control field and a multicast indication request frame information field, the multicast indication request frame control field may include a multicast session transaction identifier and contention window information, the multicast session transaction identifier is used to identify a multicast session, the contention window information is used to indicate maximum duration within which the stations send the indication frame in a contention-based manner, the multicast indication request frame information field includes a start frame sequence number, the start frame sequence number refers to a sequence number of the first frame of multicast frames sent in a multicast manner, and the multicast indication request frame information field further includes a sequence number of an end frame of the multicast frames sent in a multicast manner.

The indication frame includes an indication frame control field and an indication frame information field, the indication frame control field includes a receiving station identifier, and the indication frame information field includes a start frame sequence number and a to-be-retransmitted multicast frame bitmap.

According to this embodiment of the present invention, a multicast indication request frame is sent to multiple stations in a multicast manner to instruct the multiple stations to send an indication frame within a specified timeslot in a unicast and contention-based manner, where the indication frame includes an identifier of a to-be-retransmitted multicast frame. In this way, when there are many multicast receiving stations, there are not many multicast block acknowledgment frames, which avoids an increase in a network latency and a decrease in a system throughput rate.

Embodiment 2

Figure 3:
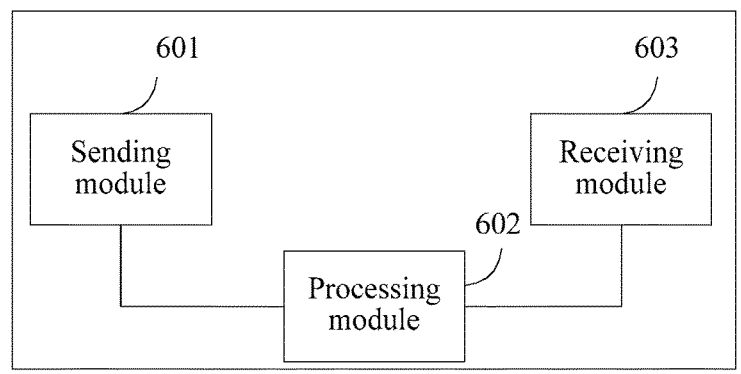
FIG. 3 is a schematic structural diagram of a multicast sending apparatus according to Embodiment 2 of the present invention.

This embodiment of the present invention provides a multicast sending apparatus. Referring to FIG. 3, the apparatus includes: a sending module 601, a processing module 602, and a receiving module 603.

The sending module 601 is configured to send at least one multicast frame to multiple stations in a multicast manner.

Each multicast frame has a sequence number (that is, an identifier) used to identify the multicast frame.

The processing module 602 is configured to generate a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame.

The sending module 601 is further configured to send the multicast indication request frame to the multiple stations in a multicast manner.

The receiving module 603 is configured to receive the indication frame.

The processing module 602 is further configured to reply with a multicast acknowledgment frame after an indication frame is received each time, where the multicast acknowledgment frame is used to indicate an identifier of an acknowledged to-be-retransmitted multicast frame, and the indication frame is generated by the stations according to the multicast indication request frame or a last received multicast acknowledgment frame.

As shown in FIG. 4, the multicast indication request frame includes the following fields: a frame control field, a duration field, a receiver address field, a transmitter address field, a multicast indication request frame control field, a multicast indication request frame information field, and a frame check field. The frame control field may include a frame type, a frame subtype, and an identifier. For example, the type is: a control frame, the frame subtype is: a multicast indication request frame, and the identifier may include content such as to DS (which indicates from a station to an access point, generally also referred to as Upload, uplink), from DS (which indicates from an access point to a station, generally also referred to as Download, downlink), and power management (power management). The duration field indicates a remaining time for a channel to transmit multicast frame acknowledgment information. The receiver address field indicates a Media Access Control (Media Access Control, "MAC" for short) address of a multicast group. The transmitter address field indicates a MAC address of an access point. The multicast indication request frame control field indicates a multicast session transaction identifier, and further includes contention window information, where the contention window information may indicate maximum duration within which the indication frame is sent in a contention-based manner. FIG. 5 shows an exemplary multicast indication request frame control field. The multicast indication request frame information field indicates sequence numbers of a start frame and an end frame that are indicated by the request indication frame. A receiving station determines, by using the frame check field, whether the received multicast indication request frame is incorrect.

As shown in FIG. 6, the indication frame includes the following fields: a frame control field, a duration field, a receiver address field, a transmitter address field, an indication frame control field, an indication frame information field, and a frame check field. Functions of the frame control field and the duration field are the same as those of the multicast indication request frame. The receiver address field indicates a MAC address of an access point. The transmitter address field indicates a MAC address of a station. The indication frame control field is similar to the multicast indication request frame control field. The indication frame information field specifically indicates a sequence number of a frame that needs to be retransmitted, and includes the identifier of the to-be-retransmitted multicast frame in Embodiment 1. For example, FIG. 7 shows an exemplary indication frame information field, and the indication frame information field includes a start frame sequence number and a to-be-retransmitted multicast frame bitmap. The access point determines, by using the frame check field, whether the received indication frame is incorrect.

As shown in FIG. 8, the multicast acknowledgment frame includes the following fields: a frame control field, a duration field, a receiver address field, a multicast acknowledgment frame control field, a multicast acknowledgment frame information field, and a frame check field. Functions of the frame control field and the duration field are the same as those of the multicast indication request frame. The receiver address field indicates a MAC address of a multicast group. The multicast acknowledgment frame information field includes a start frame sequence number and a to-be-retransmitted multicast frame bitmap, and is used to acknowledge the to-be-retransmitted frame indicated by the indication frame. FIG. 9 shows an exemplary multicast acknowledgment frame information field. A station determines, by using the frame check field, whether the received multicast acknowledgment frame is incorrect.

Further, the processing module 602 is further configured to set a first timer t1 and a second timer t2, where the first timer indicates a contention window remaining time, the second timer is used to indicate a channel idle time, and t1>t2.

Further, the processing module 602 is further configured to:

after the indication frame is received, check the indication frame; and when the check succeeds, acknowledge the to-be-retransmitted multicast frame and generate the multicast acknowledgment frame according to information of the indication frame.

Specifically, the check refers to verifying, according to the frame check field in the indication frame, whether the indication frame is correctly received.

Further, the processing module 602 is further configured to:

after generating the multicast acknowledgment frame according to the information of the indication frame, determine whether all the at least one multicast frame needs to be retransmitted; and when all the at least one multicast frame needs to be retransmitted, send the multicast acknowledgment frame, and after sending the multicast acknowledgment frame, retransmit the to-be-retransmitted multicast frame; or when not all the at least one multicast frame needs to be retransmitted, send the multicast acknowledgment frame.

An indication frame may be lost or may not be correctly received by the access point. If a receiving station successfully sends an indication frame, but receives no multicast acknowledgment frame from the access point within a subsequent short interframe space (Short Interframe Space, "SIFS" for short) time, the receiving station resends the indication frame in a contention-based manner. This process repeats until the receiving station acknowledges, according to a received multicast acknowledgment frame, that all frames of the receiving station that need to be retransmitted have been acknowledged or a time window within which the indication frame is sent in a contention-based manner ends.

Further, the processing module 602 is further configured to determine whether the first timer times out, where the first timer is used to indicate the contention window remaining time; and when the first timer times out, retransmit the to-be-retransmitted multicast frame; or when the first timer has not timed out, continue to receive the indication frame.

Further, the processing module 602 is further configured to:

when a multicast indication request frame is sent to the multiple stations in a multicast manner, set the second timer, where the second timer is used to indicate the channel idle time; and when the second timer times out, retransmit the to-be-retransmitted multicast frame.

The second timer is reset when the indication frame is received and successfully checked, when the indication frame is received and unsuccessfully checked, when data is received but the data is not the indication frame, and when a frame whose energy is greater than a threshold is received but cannot be parsed.

If the access point detects that a channel keeps idle within duration in a contention time window, it is considered that no more indication frame needs to be received, and the contention time window is ended earlier, to avoid that the channel is preempted by a subsequent network or another station that has recently woken up.

After the contention time window is ended, the access point arranges, according to the to-be-retransmitted multicast frame acknowledged in the multicast acknowledgment frame of multicast, retransmission of the frame. The to-be-retransmitted multicast frame may be sent together with a new multicast frame in a multicast manner, or may be separately arranged for retransmission. After the to-be-retransmitted multicast frame and/or a new multicast frame, the access point may send a new multicast indication request frame, and acknowledge a receiving status of a receiving station by using the foregoing method. This retransmission process may repeat until a retransmission upper limit of the frame is reached or a validity period of the frame expires.

According to this embodiment of the present invention, a multicast indication request frame is sent to multiple stations in a multicast manner to instruct the multiple stations to send an indication frame within a specified timeslot in a unicast and contention-based manner, the indication frame sent by the multiple stations in a contention-based manner is received, and a multicast acknowledgment frame is replied with after an indication frame is received each time, where the indication frame is generated by the stations according to the multicast indication request frame or a last received multicast acknowledgment frame, the indication frame includes an identifier of a to-be-retransmitted multicast frame, and identifiers of to-be-retransmitted multicast frames included in indication frames are different. Therefore, when the stations receive the multicast acknowledgment frame, if acknowledging that the multicast acknowledgment frame includes a multicast frame that needs to be retransmitted for the stations, the stations no longer need to send the indication frame, thereby saving a channel resource, and avoiding an increase in a network latency and a decrease in a system throughput rate.

Figure 10:
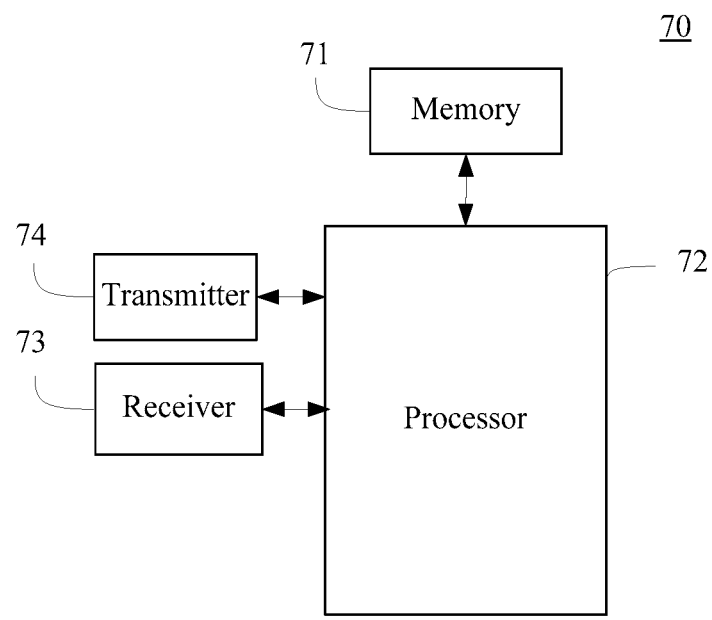
FIG. 10 is a block diagram of a multicast sending apparatus according to an embodiment of the present invention.

In a specific implementation manner, the multicast sending apparatus in FIG. 2 and FIG. 3 may be a common wireless access point, as shown in FIG. 10. The multicast sending apparatus generally includes components such as a memory 71, a processor 72, a receiver 73, and a transmitter 74. A person skilled in the art may understand that the structure shown in FIG. 10 does not constitute a limitation to the apparatus, and the apparatus may include more or fewer components than those shown in the figure, or some components may be combined, or a different component deployment may be used.

Each constituent component of the multicast sending apparatus 70 is specifically described below with reference to FIG. 10.

The memory 71 may be configured to store a software program and an application module. The processor 72 runs the software program and the application module stored in the memory 71, to implement various functional applications and data processing of the server 70. The memory 71 may mainly include a program storage area and a data storage area, where the program storage area may store an operating system, at least one application program needed by a function, and the like, and the data storage area may store data created according to processing of the multicast sending apparatus 70. In addition, the memory 71 may include a high-speed RAM (Random Access Memory, random access memory), and may also include a non-volatile memory (non-volatile memory), for example, at least one magnetic disk storage device, a flash memory device, or another volatile solid-state storage device.

The processor 72 is a control center of the multicast sending apparatus 70, and connects various parts of an entire computer by using various interfaces and lines.

Specifically, the processor 72 runs or executes the software program and/or the application module stored in the memory 71, and invokes the data stored in the memory 71, so that the processor 72 may implement: sending at least one multicast frame to multiple stations in a multicast manner by using the transmitter 74;

generating a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame; and sending the multicast indication request frame to the multiple stations in a multicast manner.

Further, the processor 72 may further implement:

receiving an indication frame by using the receiver 73; and replying with a multicast acknowledgment frame after receiving an indication frame each time, where the multicast acknowledgment frame is used to indicate an identifier of an acknowledged to-be-retransmitted multicast frame, and the indication frame is generated by the stations according to the multicast indication request frame or a last received multicast acknowledgment frame.

Further, the multicast indication request frame includes a multicast indication request frame control field and a multicast indication request frame information field, the multicast indication request frame control field includes a multicast session transaction identifier and contention window information that is used to indicate maximum duration within which the multiple stations send the indication frame in a contention-based manner, and the multicast indication request frame information field includes a start frame sequence number and an end frame sequence number.

Further, the indication frame includes an indication frame control field and an indication frame information field, the indication frame control field includes a receiving station identifier, and the indication frame information field includes a start frame sequence number and a to-be-retransmitted multicast frame bitmap.

Further, the multicast acknowledgment frame includes a multicast acknowledgment frame information field, and the multicast acknowledgment frame information field includes a start frame sequence number and a to-be-retransmitted multicast frame bitmap.

Further, the processor 72 may further implement:

after receiving the indication frame, checking the indication frame; and when the check succeeds, acknowledging the to-be-retransmitted multicast frame and generating the multicast acknowledgment frame according to information of the indication frame.

Further, the processor 72 may further implement: after the generating the multicast acknowledgment frame according to information of the indication frame, determining whether all the at least one multicast frame needs to be retransmitted; and when all the at least one multicast frame needs to be retransmitted, sending the multicast acknowledgment frame, and after sending the multicast acknowledgment frame, retransmitting the to-be-retransmitted multicast frame; or when not all the at least one multicast frame needs to be retransmitted, sending the multicast acknowledgment frame.

Further, the processor 72 may further implement:

determining whether a first timer times out, where the first timer is used to indicate a contention window remaining time; and when the first timer times out, retransmitting the to-be-retransmitted multicast frame; or when the first timer has not timed out, continuing to receive the indication frame.

Further, the processor 72 may further implement:

when a multicast indication request frame is sent to the multiple stations in a multicast manner, setting a second timer, where the second timer is used to indicate a channel idle time, where the second timer is reset when the indication frame is received and successfully checked, when the indication frame is received and unsuccessfully checked, when data is received but the data is not the indication frame, and when a frame whose energy is greater than a threshold is received but cannot be parsed; and when the second timer times out, retransmitting the to-be-retransmitted multicast frame.

Embodiment 3

Figure 11:
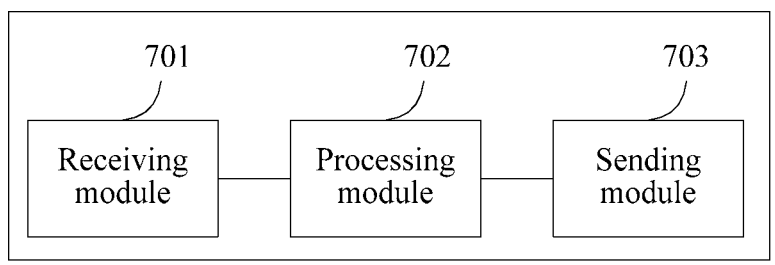
FIG. 11 is a schematic structural diagram of a multicast receiving apparatus according to Embodiment 3 of the present invention.

This embodiment of the present invention provides a multicast receiving apparatus. Referring to FIG. 11, the apparatus includes:

a receiving module 701, configured to receive a multicast indication request frame sent by an access point, where the multicast request indication frame includes an identifier of at least one multicast frame, and the multicast indication request frame is used to instruct multiple stations to send an indication frame within a specified timeslot in a unicast and contention-based manner;

a processing module 702, configured to determine an identifier of a to-be-retransmitted multicast frame according to the multicast indication request frame; and a sending module 703, configured to send the indication frame within the specified timeslot in a contention-based manner, where the indication frame includes the identifier of the to-be-retransmitted multicast frame.

Structures of the multicast indication request frame, the indication frame, and the multicast acknowledgment frame are described in Embodiment 1 or 2, and details are not described herein again.

According to this embodiment of the present invention, a multicast indication request frame sent by an access point is received, an identifier of a to-be-retransmitted multicast frame is determined according to the multicast indication request frame, and an indication frame is sent within a specified timeslot in a contention-based manner, where the indication frame includes the identifier of the to-be-retransmitted multicast frame. In this way, when there are many multicast receiving stations, there are not many multicast block acknowledgment frames, which avoids an increase in a network latency and a decrease in a system throughput rate.

Embodiment 4

Figure 12:
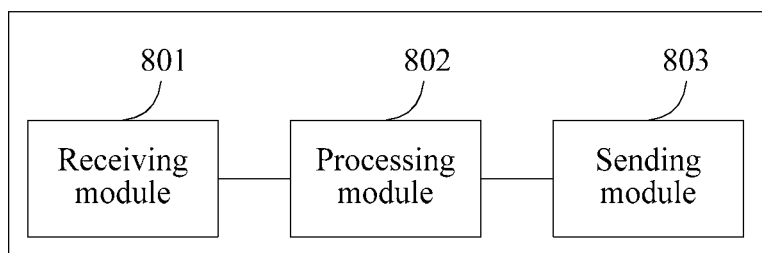
FIG. 12 is a schematic structural diagram of a multicast receiving apparatus according to Embodiment 4 of the present invention.

This embodiment of the present invention provides a multicast receiving apparatus. Referring to FIG. 12, the apparatus includes:

a receiving module 801, configured to receive a multicast indication request frame sent by an access point, where the multicast request indication frame includes an identifier of at least one multicast frame, and the multicast indication request frame is used to instruct multiple stations to send an indication frame within a specified timeslot in a unicast and contention-based manner;

a processing module 802, configured to determine an identifier of a to-be-retransmitted multicast frame according to the multicast indication request frame; and a sending module 803, configured to send the indication frame within the specified timeslot in a contention-based manner, where the indication frame includes the identifier of the to-be-retransmitted multicast frame.

The receiving module 801 is further configured to: receive a multicast acknowledgment frame, where the multicast acknowledgment frame is sent by the access point after the access point receives the indication frame, and the multicast acknowledgment frame is used to indicate an identifier of an acknowledged to-be-retransmitted multicast frame; and when the identifier of the acknowledged to-be-retransmitted multicast frame in the multicast acknowledgment frame includes the identifier of the to-be-retransmitted multicast frame, stop sending the indication frame in a contention-based manner.

Structures of the multicast indication request frame, the indication frame, and the multicast acknowledgment frame are described in Embodiment 1 or 2, and details are not described herein again.

Further, after the multicast indication request frame is received, the processing module 802 is further configured to: determine whether the processing module 80 is a multicast receiving station, and when the processing module 80 is a multicast receiving station, control a timing module 804 to set a first timer.

Specifically, the determining may be performed according to a multicast session transaction identifier in the multicast indication request frame. Certainly, the determining may be performed according to another field such as a MAC address of a multicast group.

In this embodiment, after determining the identifier of the to-be-retransmitted multicast frame according to the multicast indication request frame, the processing module 802 generates a retransmission list. That is, in this embodiment, the identifier of the to-be-retransmitted multicast frame exists in a form of a list, and in another embodiment, the identifier of the to-be-retransmitted multicast frame may further exist in another form.

Before the indication frame is sent in a contention-based manner, further, the processing module 802 may first determine whether the retransmission list is empty. If the retransmission list is empty, the process ends. If the retransmission list is not empty, the indication frame is sent in a contention-based manner.

Further, the processing module 802 is further configured to: when the indication frame is sent in a contention-based manner, determine whether the first timer times out, where the first timer is used to indicate a contention window remaining time; and when the first timer times out, stop sending the indication frame in a contention-based manner; or when the first timer has not timed out, continue to send the indication frame in a contention-based manner.

The first timer may be set by the processing module 802.

Further, the processing module 802 is further configured to: when the indication frame is sent successfully in a contention-based manner, if a third timer times out and the multicast acknowledgment frame is not received, resend the indication frame in a contention-based manner, where the third timer is used to indicate a time that has elapsed after the indication frame is sent, to determine whether the sent indication frame is received by the access point.

The third timer t3 may be set by the processing module 802. t3 may be an SIFS time, and if a station receives no multicast acknowledgment frame from the access point within the time t3, the receiving station resends the indication frame in a contention-based manner. This process repeats until the receiving station acknowledges, according to a received multicast acknowledgment frame, that all frames of the receiving station that need to be retransmitted have been acknowledged or a time window within which the indication frame is sent in a contention-based manner ends.

Further, the processing module 802 is further configured to: when the indication frame is sent unsuccessfully in a contention-based manner, if the multicast acknowledgment frame is received, generate the indication frame according to the multicast acknowledgment frame, and resend the indication frame in a contention-based manner.

Specifically, if the multicast acknowledgment frame is received before the indication frame is sent, a retransmission list is updated according to the multicast acknowledgment frame, and then, the indication frame is sent in a contention-based manner. That the retransmission list is updated according to the multicast acknowledgment frame refers to that: when a station receives the multicast acknowledgment frame, the station views an identifier of a to-be-retransmitted multicast frame notified by the access point, then views the identifier of the to-be-retransmitted multicast frame in the indication frame that the station needs to send, and removes, from the indication frame, the identifier of the to-be-retransmitted multicast frame that already exists in the multicast acknowledgment frame.

According to this embodiment of the present invention, a multicast indication request frame sent by an access point is received, an identifier of a to-be-retransmitted multicast frame is determined according to the multicast indication request frame, when the identifier of the to-be-retransmitted multicast frame is not empty, an indication frame is sent in a contention-based manner, a multicast acknowledgment frame sent by the access point is received, and when the multicast acknowledgment frame includes the to-be-retransmitted multicast frame, sending the indication frame in a contention-based manner is stopped. A station may be unsuccessful in contention, and in this case, the multicast acknowledgment frame is generated by the access point according to an indication frame of another station, thereby saving a channel resource, and avoiding an increase in a network latency and a decrease in a system throughput rate.

Figure 13:
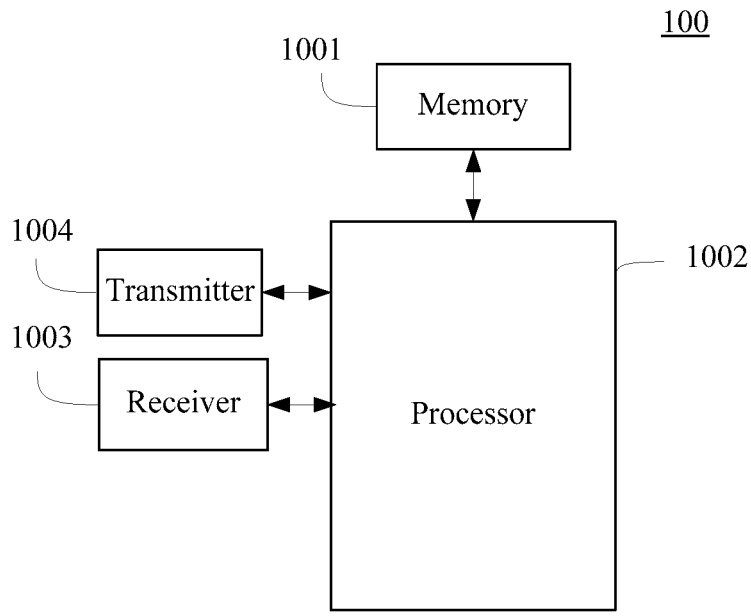
FIG. 13 is a block diagram of a multicast receiving apparatus according to an embodiment of the present invention.

In a specific implementation manner, the multicast receiving apparatus in FIG. 11 and FIG. 12 may be a computer or a mobile terminal, as shown in FIG. 13. The multicast receiving apparatus generally includes components such as a memory 1001, a processor 1002, a receiver 1003, and a transmitter 1004. A person skilled in the art may understand that the structure shown in FIG. 13 does not constitute a limitation to the apparatus, and the apparatus may include more or fewer components than those shown in the figure, or some components may be combined, or a different component deployment may be used.

Each constituent component of a computer 100 is specifically described below with reference to FIG. 13.

The memory 1001 may be configured to store a software program and an application module. The processor 1002 runs the software program and the application module stored in the memory 1001, to implement various functional applications and data processing of the server 1000. The memory 1001 may mainly include a program storage area and a data storage area, where the program storage area may store an operating system, at least one application program needed by a function, and the like, and the data storage area may store data created according to processing of the computer 100. In addition, the memory 1001 may include a high-speed RAM, and may further include a non-volatile memory, for example, at least one magnetic disk storage device, a flash memory device, or other volatile solid-state storage devices.

The processor 1002 is a control center of the computer 100, and connects various parts of an entire computer by using various interfaces and lines.

Specifically, the processor 1002 runs or executes the software program and/or the application module stored in the memory 1001, and invokes the data stored in the memory 1001, so that the processor 1002 may implement:

receiving, by using the receiver 1003, a multicast indication request frame sent by an access point, where the multicast request indication frame includes an identifier of at least one multicast frame, and the multicast indication request frame is used to instruct multiple stations to send an indication frame within a specified timeslot in a unicast and contention-based manner;

determining an identifier of a to-be-retransmitted multicast frame according to the multicast indication request frame; and sending the indication frame within the specified timeslot in a contention-based manner, where the indication frame includes the identifier of the to-be-retransmitted multicast frame.

Further, the processor 1002 may further implement: receiving a multicast acknowledgment frame, where the multicast acknowledgment frame is sent by the access point after the access point receives the indication frame, and the multicast acknowledgment frame is used to indicate an identifier of an acknowledged to-be-retransmitted multicast frame; and when the identifier of the acknowledged to-be-retransmitted multicast frame in the multicast acknowledgment frame includes the identifier of the to-be-retransmitted multicast frame, stopping sending the indication frame in a contention-based manner.

Further, the processor 1002 may further implement: when the indication frame is sent in a contention-based manner, determining whether a first timer times out, where the first timer is used to indicate a contention window remaining time; and when the first timer times out, stopping sending the indication frame in a contention-based manner.

Further, the processor 1002 may further implement: when the indication frame is sent successfully in a contention-based manner, if a third timer times out and the multicast acknowledgment frame is not received, resending the indication frame in a contention-based manner, where the third timer is used to indicate a time that has elapsed after the indication frame is sent.

Further, the processor 1002 may further implement: when the indication frame is sent unsuccessfully in a contention-based manner, if the multicast acknowledgment frame is received, generating the indication frame according to the multicast acknowledgment frame, and resending the indication frame in a contention-based manner.

Embodiment 5

Figure 14:
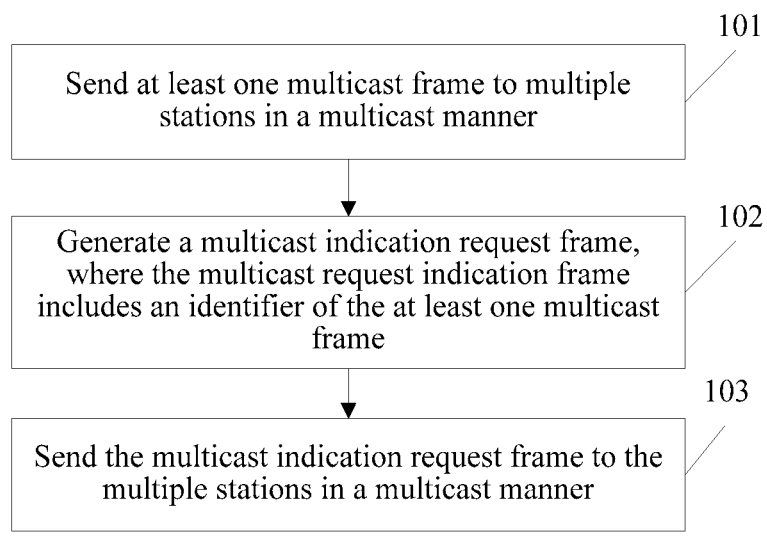
FIG. 14 is a flowchart of a multicast transmission acknowledgment method according to Embodiment 5 of the present invention.

This embodiment of the present invention provides a multicast transmission acknowledgment method, and the method is executed by an access point (a multicast sending apparatus). Referring to FIG. 14, the method includes:

Step 101. Send at least one multicast frame to multiple stations in a multicast manner.

Step 102. Generate a multicast indication request frame, where the multicast request indication frame includes an identifier of the at least one multicast frame, the multicast indication request frame is used to instruct the multiple stations to send an indication frame within a specified timeslot in a unicast and contention-based manner, and the indication frame includes an identifier of a to-be-retransmitted multicast frame.

The multicast indication request frame may include a multicast indication request frame control field and a multicast indication request frame information field, the multicast indication request frame control field may include a multicast session transaction identifier and contention window information, the multicast session transaction identifier is used to identify a multicast session, the contention window information is used to indicate maximum duration within which the stations send the indication frame in a contention-based manner, the multicast indication request frame information field includes a start frame sequence number, the start frame sequence number refers to a sequence number of the first frame of multicast frames sent in a multicast manner, and the multicast indication request frame information field further includes a sequence number of an end frame of the multicast frames sent in a multicast manner.

The indication frame includes an indication frame control field and an indication frame information field, the indication frame control field includes a receiving station identifier, and the indication frame information field includes a start frame sequence number and a to-be-retransmitted multicast frame bitmap.

Step 103. Send the multicast indication request frame to the multiple stations in a multicast manner.

According to this embodiment of the present invention, a multicast indication request frame is sent to multiple stations in a multicast manner to instruct the multiple stations to send an indication frame within a specified timeslot in a unicast and contention-based manner, where the indication frame includes an identifier of a to-be-retransmitted multicast frame. In this way, when there are many multicast receiving stations, there are not many multicast block acknowledgment frames, which avoids an increase in a network latency and a decrease in a system throughput rate.

Embodiment 6

Figure 15:
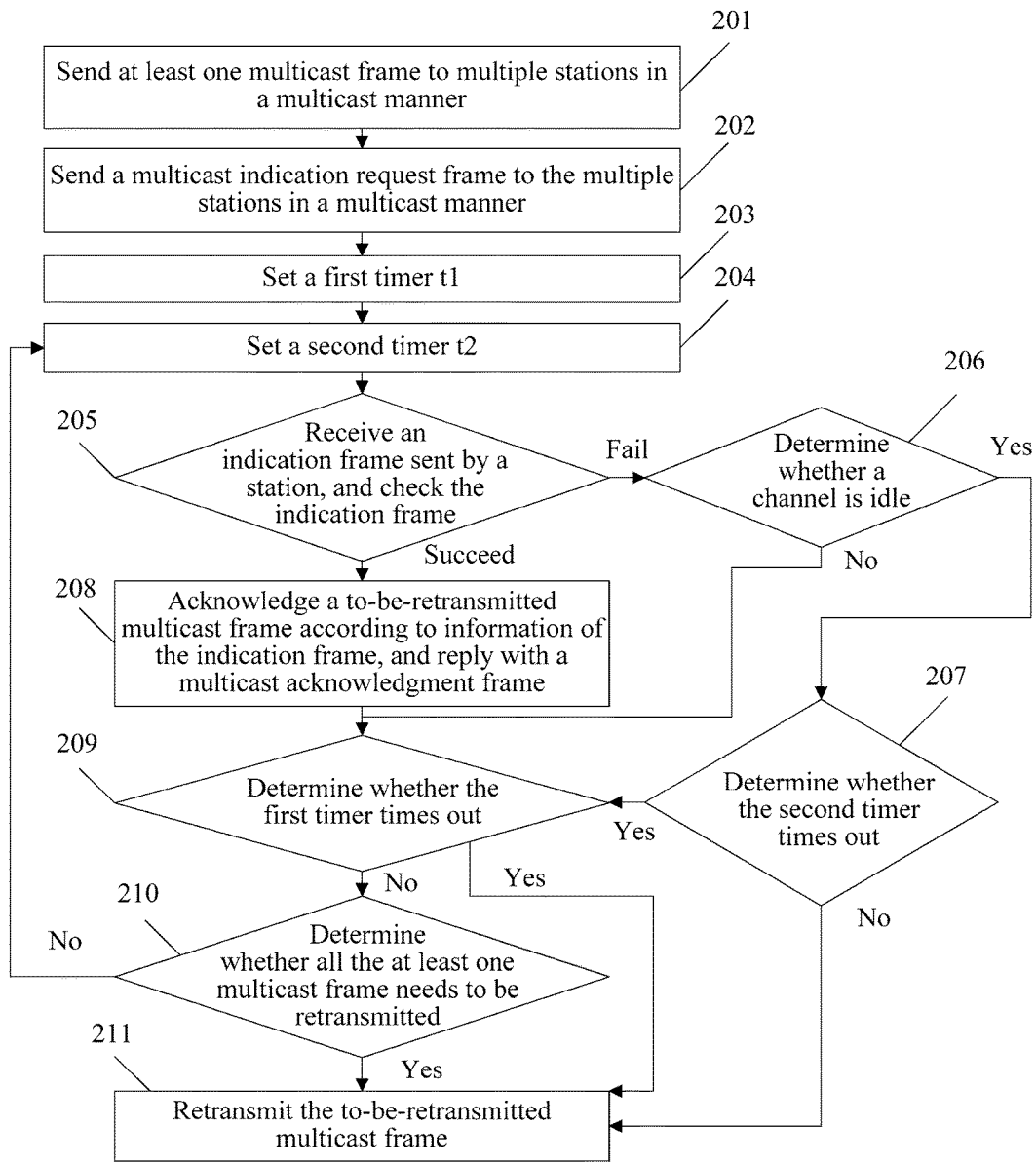
FIG. 15 is a flowchart of a multicast transmission acknowledgment method according to Embodiment 6 of the present invention.

This embodiment of the present invention provides a multicast transmission acknowledgment method, and the method is executed by an access point (a multicast sending apparatus). Referring to FIG. 15, the method includes:

Step 201. Send at least one multicast frame to multiple stations in a multicast manner.

Each multicast frame has a sequence number (that is, an identifier) used to identify the multicast frame.

Step 202. Send a multicast indication request frame to the multiple stations in a multicast manner, where the multicast indication request frame is used to instruct the multiple stations to send an indication frame within a specified timeslot in a unicast and contention-based manner.

The multicast indication request frame is generated by the access point after the at least one multicast frame is sent.

Referring to FIG. 4 again, the multicast indication request frame may include the following fields: a frame control field, a duration field, a receiver address field, a transmitter address field, a multicast indication request frame control field, a multicast indication request frame information field, and a frame check field. The frame control field includes a frame type, a frame subtype, and an identifier. For example, the type is: a control frame, the frame subtype is: a multicast indication request frame, and the identifier may include content such as to DS, from DS, and power management. The duration field indicates a remaining time for a channel to transmit multicast frame acknowledgment information. The receiver address field indicates a MAC address of a multicast group. The transmitter address field indicates a MAC address of the access point. The multicast indication request frame control field indicates a multicast session transaction identifier, and further includes contention window information, where the contention window information may indicate maximum duration within which the indication frame is sent in a contention-based manner. FIG. 5 shows an exemplary multicast indication request frame control field. The multicast indication request frame information field indicates sequence numbers of a start frame and an end frame that are indicated by the request indication frame. A receiving station determines, by using the frame check field, whether the received multicast indication request frame is incorrect.

Referring to FIG. 6 again, the indication frame may include the following fields: a frame control field, a duration field, a receiver address field, a transmitter address field, an indication frame control field, an indication frame information field, and a frame check field. Functions of the frame control field and the duration field are the same as those of the multicast indication request frame. The receiver address field indicates a MAC address of the access point. The transmitter address field indicates a MAC address of a station. The indication frame control field is similar to the multicast indication request frame control field. The indication frame information field specifically indicates a sequence number of a frame that needs to be retransmitted, and includes the identifier of the to-be-retransmitted multicast frame in Embodiment 1. For example, FIG. 7 shows an exemplary indication frame information field, and the indication frame information field includes a start frame sequence number and a to-be-retransmitted multicast frame bitmap. The access point determines, by using the frame check field, whether the received indication frame is incorrect.

Step 203. Set a first timer t1, where the first timer indicates a contention window remaining time.

Step 204. Set a second timer t2, where the second timer is used to indicate a channel idle time, and t1>t2.

The second timer is reset when the indication frame is received and successfully checked, when the indication frame is received and unsuccessfully checked, when data is received but the data is not the indication frame, and when a frame whose energy is greater than a threshold is received but cannot be parsed.

Step 205: Receive an indication frame sent by a station; after receiving the indication frame, check the indication frame. When the check succeeds, perform step 208. When the check fails, perform step 206.

Specifically, the check refers to verifying, according to a frame check field in the indication frame, whether the indication frame is correctly received.

Step 206. Determine whether a channel is idle. If the channel is not idle, perform step 209. If the channel is idle, perform step 207.

Step 207. Determine whether the second timer times out. If the second timer times out, perform step 211. If the second timer has not timed out, perform step 209.

If the access point detects that a channel keeps idle within duration in a contention time window, it is considered that no more indication frame needs to be received, and the contention time window is ended earlier, to avoid that the channel is preempted by a subsequent network or another station that has recently woken up.

Step 208. Acknowledge a to-be-retransmitted multicast frame according to information of the indication frame, and reply with a multicast acknowledgment frame.

Referring to FIG. 8 again, the multicast acknowledgment frame includes the following fields: a frame control field, a duration field, a receiver address field, a multicast acknowledgment frame control field, a multicast acknowledgment frame information field, and a frame check field. Functions of the frame control field and the duration field are the same as those of the multicast indication request frame. The receiver address field indicates a MAC address of a multicast group. The multicast acknowledgment frame information field includes a start frame sequence number and a to-be-retransmitted multicast frame bitmap, and is used to acknowledge the to-be-retransmitted frame indicated by the indication frame. FIG. 9 shows an exemplary multicast acknowledgment frame information field. A station determines, by using the frame check field, whether the received multicast acknowledgment frame is incorrect.

Step 209. Determine whether the first timer times out. If the first timer times out, perform step 211. If the first timer has not timed out, perform step 210.

Step 210. Determine whether all the at least one multicast frame needs to be retransmitted. When all the at least one multicast frame needs to be retransmitted, perform step 211. When not all the at least one multicast frame needs to be retransmitted, perform step 204.

An indication frame may be lost or may not be correctly received by the access point. If a receiving station successfully sends an indication frame, but receives no multicast acknowledgment frame from the access point within a subsequent SIFS time, the receiving station resends the indication frame in a contention-based manner. This process repeats until the receiving station acknowledges, according to a received multicast acknowledgment frame, that all frames of the receiving station that need to be retransmitted have been acknowledged or a time window within which the indication frame is sent in a contention-based manner ends.

Step 211. Send the multicast acknowledgment frame, and after sending the multicast acknowledgment frame, retransmit the to-be-retransmitted multicast frame.

After the contention time window is ended, the access point arranges, according to the to-be-retransmitted multicast frame acknowledged in the multicast acknowledgment frame of multicast, retransmission of the frame. The to-be-retransmitted multicast frame may be sent together with a new multicast frame in a multicast manner, or may be separately arranged for retransmission. After the to-be-retransmitted multicast frame and/or a new multicast frame, the access point may send a new multicast indication request frame, and acknowledge a receiving status of a receiving station by using the foregoing method. This retransmission process may repeat until a retransmission upper limit of the frame is reached or a validity period of the frame expires.

According to this embodiment of the present invention, a multicast indication request frame is sent to multiple stations in a multicast manner to instruct the multiple stations to send an indication frame within a specified timeslot in a unicast and contention-based manner, the indication frame sent by the multiple stations in a contention-based manner is received, and a multicast acknowledgment frame is replied with after an indication frame is received each time, where the indication frame is generated by the stations according to the multicast indication request frame or a last received multicast acknowledgment frame, the indication frame includes an identifier of a to-be-retransmitted multicast frame, and identifiers of to-be-retransmitted multicast frames included in indication frames are different. Therefore, when the stations receive the multicast acknowledgment frame, if acknowledging that the multicast acknowledgment frame includes a multicast frame that needs to be retransmitted for the stations, the stations no longer need to send the indication frame, thereby saving a channel resource, and avoiding an increase in a network latency and a decrease in a system throughput rate.

Embodiment 7

Figure 16:
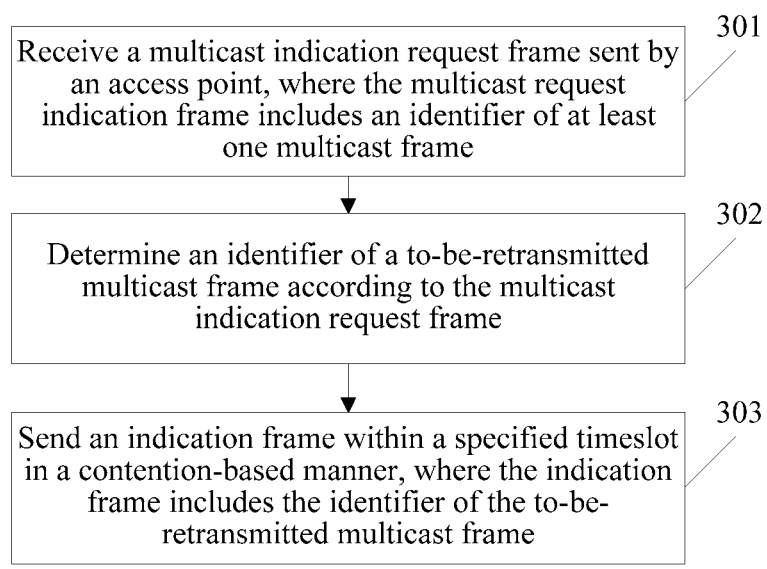
FIG. 16 is a flowchart of a multicast transmission acknowledgment method according to Embodiment 7 of the present invention.

This embodiment of the present invention provides a multicast transmission acknowledgment method, and the method is executed by a station (a multicast receiving apparatus). Referring to FIG. 16, the method includes:

Step 301. Receive a multicast indication request frame sent by an access point, where the multicast request indication frame includes an identifier of at least one multicast frame, and the multicast indication request frame is used to instruct multiple stations to send an indication frame within a specified timeslot in a unicast and contention-based manner.

Step 302. Determine an identifier of a to-be-retransmitted multicast frame according to the multicast indication request frame.

Step 303. Send an indication frame within a specified timeslot in a contention-based manner, where the indication frame includes the identifier of the to-be-retransmitted multicast frame.

Structures of the multicast indication request frame and the indication frame are described in Embodiment 5 or 6, and details are not described herein again.

According to this embodiment of the present invention, a multicast indication request frame sent by an access point is received, an identifier of a to-be-retransmitted multicast frame is determined according to the multicast indication request frame, and an indication frame is sent within a specified timeslot in a contention-based manner, where the indication frame includes the identifier of the to-be-retransmitted multicast frame. In this way, when there are many multicast receiving stations, there are not many multicast block acknowledgment frames, which avoids an increase in a network latency and a decrease in a system throughput rate.

Embodiment 8

Figure 17:
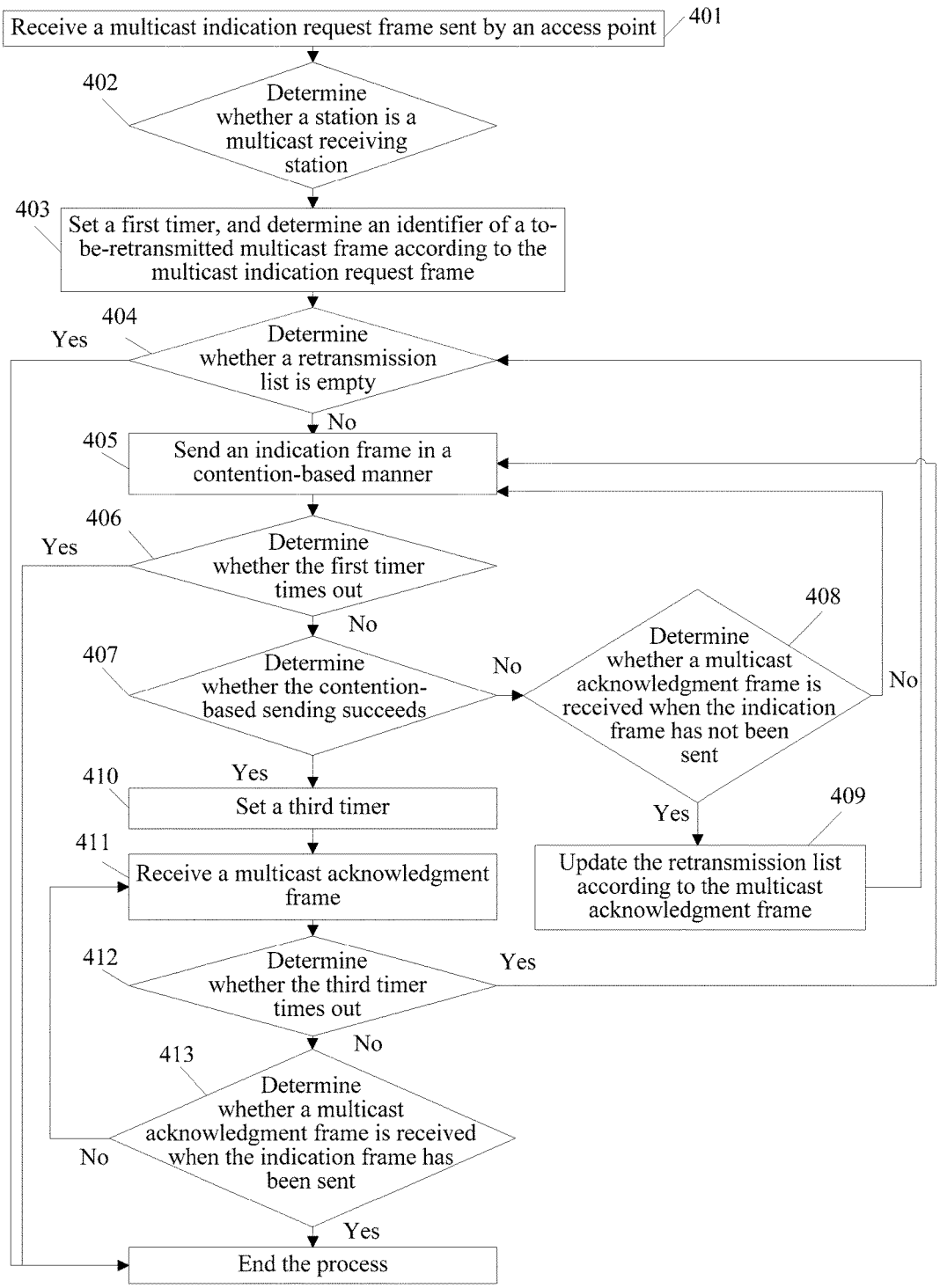
FIG. 17 is a flowchart of a multicast transmission acknowledgment method according to Embodiment 8 of the present invention.

This embodiment of the present invention provides a multicast transmission acknowledgment method, and the method is executed by a station (a multicast receiving apparatus). Referring to FIG. 17, the method includes:

Step 401. Receive a multicast indication request frame sent by an access point.

Step 402. Determine whether the station is a multicast receiving station. If the station is a multicast receiving station, perform step 403. If the station is not a multicast receiving station, end the process.

Specifically, whether the station is a multicast receiving station may be determined according to a multicast session transaction identifier in the multicast indication request frame, that is, if the multicast session transaction identifier is the same as an identifier of a multicast session that the station performs, it is determined that the station is a multicast receiving station. Certainly, the determining may be performed according to another field such as a MAC address of a multicast group.

Step 403. Set a first timer, where the first timer indicates a contention window remaining time t1; and determine an identifier of a to-be-retransmitted multicast frame according to the multicast indication request frame, and generate a retransmission list.

In this embodiment, the identifier of the to-be-retransmitted multicast frame exists in a form of a list, and in another embodiment, the identifier of the to-be-retransmitted multicast frame may further exist in another form.

Specifically, a multicast frame that has been sent by the access point is determined according to the multicast request indication frame, a multicast frame that is received by the station is determined, and the to-be-retransmitted multicast frame that needs to be retransmitted may be determined by means of comparison.

Step 404. Determine whether the retransmission list is empty. If the retransmission list is empty, end the process. If the retransmission list is not empty, perform step 405.

Step 405. Send an indication frame in a contention-based manner, where the indication frame includes the identifier of the to-be-retransmitted multicast frame.

Step 406. Determine whether the first timer times out. If the first timer times out, end the process. If the first timer has not timed out, perform step 407.

Step 407. Determine whether the contention-based sending succeeds. If the contention-based sending succeeds, perform step 410. If the contention-based sending fails, perform step 408.

Step 408. Determine whether a multicast acknowledgment frame is received when the indication frame has not been sent. If the multicast acknowledgment frame is received when the indication frame has not been sent, perform step 409. If the multicast acknowledgment frame is not received when the indication frame has not been sent, perform step 405.

That is, when the contention-based sending fails, the multicast acknowledgment frame is received. In addition, that it is determined whether the multicast acknowledgment frame is received when the indication frame has not been sent may further refer to: when the indication frame is being sent in a contention-based manner, it is determined whether the multicast acknowledgment frame is received.

Step 409. Update the retransmission list according to the multicast acknowledgment frame, and then perform step 405.

Specifically, when the station receives the multicast acknowledgment frame, the station views an identifier of a to-be-retransmitted multicast frame notified by the access point, then views the identifier of the to-be-retransmitted multicast frame in the indication frame that the station needs to send, and removes, from the indication frame, the identifier of the to-be-retransmitted multicast frame that already exists in the multicast acknowledgment frame.

Step 410. Set a third timer t3, where the third timer is used to indicate a time that has elapsed after the indication frame is sent, to determine whether the sent indication frame is received by the access point.

t3 may be an SIFS time, and if the station receives no multicast acknowledgment frame from the access point within the time t3, the receiving station resends the indication frame in a contention-based manner. This process repeats until the receiving station acknowledges, according to a received multicast acknowledgment frame, that all frames of the receiving station that need to be retransmitted have been acknowledged or a time window within which the indication frame is sent in a contention-based manner ends.

Step 411. Receive a multicast acknowledgment frame.

Step 412. Determine whether the third timer times out. If the third timer times out, perform step 405. If the third timer has not timed out, perform step 413.

Step 413. Determine that a multicast acknowledgment frame is received when the indication frame has been sent. If the multicast acknowledgment frame is received when the indication frame has been sent, end the process. If the multicast acknowledgment frame is not received when the indication frame has been sent, perform step 411.

That is, after the indication frame is successfully sent in a contention-based manner, the multicast acknowledgment frame is received.

Structures of the multicast indication request frame, the indication frame, and the multicast acknowledgment frame are described in Embodiment 5 or 6, and details are not described herein again.

According to this embodiment of the present invention, a multicast indication request frame sent by an access point is received, an identifier of a to-be-retransmitted multicast frame is determined according to the multicast indication request frame, when the identifier of the to-be-retransmitted multicast frame is not empty, an indication frame is sent in a contention-based manner, a multicast acknowledgment frame sent by the access point is received, and when the multicast acknowledgment frame includes the to-be-retransmitted multicast frame, sending the indication frame in a contention-based manner is stopped. A station may be unsuccessful in contention, and in this case, the multicast acknowledgment frame is generated by the access point according to an indication frame of another station, thereby saving a channel resource, and avoiding an increase in a network latency and a decrease in a system throughput rate.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A multicast sending apparatus, wherein the apparatus comprises:
a sending module, configured to send at least one multicast frame to multiple stations in a multicast manner;
a processing module, configured to generate a multicast indication request frame, wherein the multicast indication request frame comprises an identifier of the at least one multicast frame, the multicast indication request frame is used to instruct the multiple stations to each send an indication frame within a specified timeslot in a unicast and contention-based manner when retransmission of a multicast frame is needed by the station, wherein
the sending module is further configured to send the multicast indication request frame to the multiple stations in the multicast manner; and
a receiving module, configured to receive indication frames sent by the multiple stations in the contention-based manner, wherein each indication frame received from the multiple stations comprises an identifier of a specific to-be-retransmitted multicast frame that needs to be retransmitted for the respective station that sent the indication frame;
wherein the processing module is further configured to reply with a multicast acknowledgment frame after each indication frame is received, wherein the multicast acknowledgment frame is used to indicate an identifier of an acknowledged to-be-retransmitted multicast frame, so that each respective station that sent an indication frame stops sending the indication frame in the contention-based manner when the respective station determines that the identifier of the acknowledged to-be-transmitted multicast frame matches the identifier of the specific to-be-retransmitted multicast frame.

2. The apparatus according to claim 1, wherein each indication frame is generated by the respective station according to the multicast indication request frame or a last received multicast acknowledgment frame, and wherein identifiers of to-be-retransmitted multicast frames included in two different indication frames are different.

3. The apparatus according to claim 2, wherein the multicast acknowledgment frame comprises a multicast acknowledgment frame information field, and the multicast acknowledgment frame information field comprises a start frame sequence number and a to-be-retransmitted multicast frame bitmap.

4. The apparatus according to claim 1, wherein the multicast indication request frame comprises a multicast indication request frame control field and a multicast indication request frame information field, the multicast indication request frame control field comprises a multicast session transaction identifier and contention window information, and the multicast indication request frame information field comprises a start frame sequence number.

5. The apparatus according to claim 1, wherein the indication frame comprises an indication frame control field and an indication frame information field, the indication frame control field comprises a receiving station identifier, and the indication frame information field comprises a start frame sequence number and a to-be-retransmitted multicast frame bitmap.

6. The apparatus according to claim 1, wherein the processing module is configured to:
after each indication frame is received, check the indication frame; and
when the check succeeds, acknowledge the to-be-retransmitted multicast frame and generate the multicast acknowledgment frame according to information of the indication frame.

7. The apparatus according to claim 6, wherein the processing module is further configured to:
after generating the multicast acknowledgment frame according to the information of the indication frame, determine whether all the at least one multicast frame needs to be retransmitted; and
when all the at least one multicast frame needs to be retransmitted, send the multicast acknowledgment frame, and after sending the multicast acknowledgment frame, retransmit the to-be-retransmitted multicast frame; or when not all the at least one multicast frame needs to be retransmitted, send the multicast acknowledgment frame.

8. A multicast receiving apparatus, wherein the apparatus comprises:
a receiving module, configured to receive a multicast indication request frame sent by an access point, wherein the multicast indication request frame comprises an identifier of at least one multicast frame, and the multicast indication request frame is used to instruct multiple stations to each send an indication frame within a specified timeslot in a unicast and a contention-based manner;
a processing module, configured to determine an identifier of a to-be-retransmitted multicast frame according to the multicast indication request frame; and
a sending module, configured to send the indication frame within the specified timeslot in the contention-based manner, wherein the indication frame comprises the identifier of the to-be-retransmitted multicast frame;
wherein the receiving module is further configured to receive a multicast acknowledgment frame sent by the access point, wherein the multicast acknowledgment frame is sent by the access point responsive to the access point receiving the indication frame or another indication frame sent by another receiving apparatus, and the multicast acknowledgment frame is used to indicate an identifier of an acknowledged to-be-retransmitted multicast frame; and
when the identifier of the acknowledged to-be-retransmitted multicast frame in the multicast acknowledgment frame matches the identifier of the to-be-retransmitted multicast frame, stop sending the indication frame in a contention-based manner.

9. The apparatus according to claim 8, wherein the processing module is further configured to: when the indication frame is sent in a contention-based manner, determine whether a first timer times out, wherein the first timer is used to indicate a contention window remaining time; and
when the first timer times out, stop sending the indication frame in a contention-based manner.

10. A multicast transmission acknowledgment method, wherein the method comprises:

sending at least one multicast frame to multiple stations in a multicast manner;

generating a multicast indication request frame, wherein the multicast indication request frame comprises an identifier of the at least one multicast frame, the multicast indication request frame is used to instruct the multiple stations to each send an indication frame within a specified timeslot in a unicast and contention-based manner when retransmission of a multicast frame is needed by the station;

sending the multicast indication request frame to the multiple stations in a multicast manner; and receiving indication frames sent by the multiple stations in the contention-based manner, wherein each indication frame received from the multiple stations comprises an identifier of a specific to-be-retransmitted multicast frame that needs to be retransmitted for the respective station that sent the indication frame;

replying with a multicast acknowledgment frame after each indication frame is received, wherein the multicast acknowledgment frame is used to indicate an identifier of an acknowledged to-be-retransmitted multicast frame, so that each respective station that sent an indication frame stops sending the indication frame in the contention-based manner when the respective station determines that the identifier of the acknowledged to-be-transmitted multicast frame matches the identifier of the specific to-be-retransmitted multicast frame.

11. The method according to claim 10, wherein each indication frame is generated by the respective station according to the multicast indication request frame or a last received multicast acknowledgment frame, and wherein identifiers of to-be-retransmitted multicast frames included in two different indication frames are different.

12. The method according to claim 11, wherein the multicast acknowledgment frame comprises a multicast acknowledgment frame information field, and the multicast acknowledgment frame information field comprises a start frame sequence number and a to-be-retransmitted multicast frame bitmap.

13. The method according to claim 11, wherein the replying with a multicast acknowledgment frame after each indication frame is received comprises:

after receiving each indication frame, checking the indication frame; and when the check succeeds, acknowledging the to-be-retransmitted multicast frame and generating the multicast acknowledgment frame according to information of the indication frame.

14. The method according to claim 10, wherein the multicast indication request frame comprises a multicast indication request frame control field and a multicast indication request frame information field, the multicast indication request frame control field comprises a multicast session transaction identifier and contention window information that is used to indicate maximum duration within which the multiple stations send the indication frame in a contention-based manner, and the multicast indication request frame information field comprises a start frame sequence number and an end frame sequence number.

15. The method according to claim 10, wherein the indication frame comprises an indication frame control field and an indication frame information field, the indication frame control field comprises a receiving station identifier, and the indication frame information field comprises a start frame sequence number and a to-be-retransmitted multicast frame bitmap.

16. A multicast transmission acknowledgment method, wherein the method comprises:

receiving a multicast indication request frame sent by an access point, wherein the multicast indication request frame comprises an identifier of at least one multicast frame, and the multicast indication request frame is used to instruct multiple stations to each send an indication frame within a specified timeslot in a unicast and contention-based manner;

determining an identifier of a to-be-retransmitted multicast frame according to the multicast indication request frame; and sending the indication frame within the specified timeslot in a contention-based manner, wherein the indication frame comprises the identifier of the to-be-retransmitted multicast frame, receiving a multicast acknowledgment frame sent by the access point, wherein the multicast acknowledgment frame is sent by the access point responsive to the access point receiving the indication frame or another indication frame sent by another receiving apparatus, and the multicast acknowledgment frame is used to indicate an identifier of an acknowledged to-be-retransmitted multicast frame; and when the identifier of the acknowledged to-be-retransmitted multicast frame in the multicast acknowledgment frame matches the identifier of the to-be-retransmitted multicast frame, stop sending the indication frame in a contention-based manner.

17. The method according to claim 16, wherein when the indication frame is sent in a contention-based manner, the method further comprises:

determining whether a first timer times out, wherein the first timer is used to indicate a contention window remaining time; and when the first timer times out, stopping sending the indication frame in a contention-based manner.

18. The method according to claim 16, wherein when the indication frame is sent successfully in a contention-based manner, the method further comprises:

when a third timer times out and the multicast acknowledgment frame is not received, resending the indication frame in a contention-based manner, wherein the third timer is used to indicate a time that has elapsed after the indication frame is sent.

* * * * *